Patented July 2, 1935

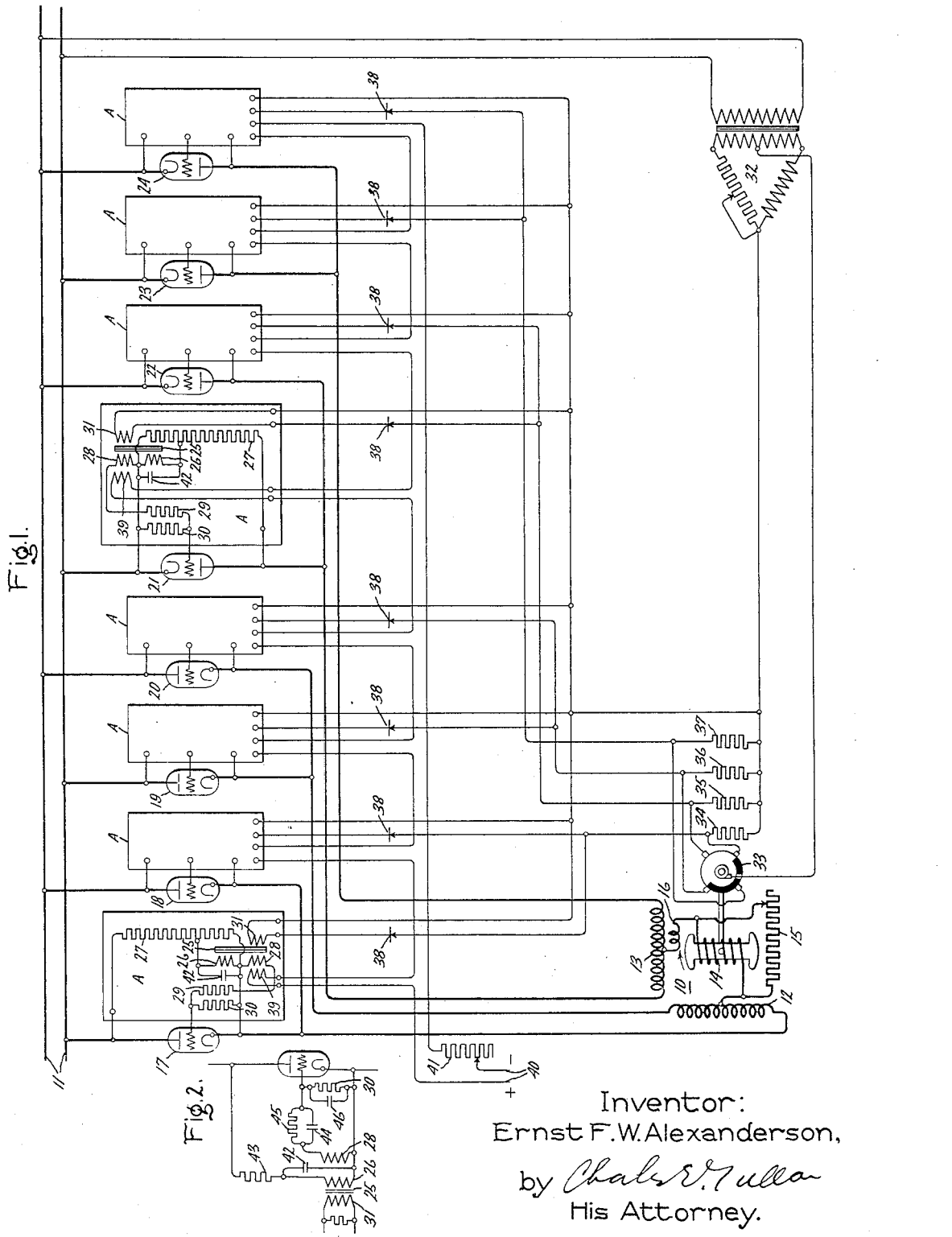

2,006,979

UNITED STATES PATENT OFFICE 2,006,979

ELECTRIC VALVE EXCITATION CIRCUITS

Ernst F. W. Alexanderson, Schenectady, N. Y., assignor to General Electric Company, a corporation of New York Application May 11, 1933, Serial No. 670,499

11 Claims. (Cl. 175—363)

My invention relates to electric valve converting apparatus and more particularly to excitation circuits for the electric valves of such converting apparatus.

There are now well known in the art numerous electric valve converting apparatus for transmitting energy between direct and alternating current circuits, direct current circuits of different voltages, or independent alternating current circuits of the same or different frequencies. The use of vapor electric discharge valves in such circuits has been found particularly advantageous because of the relatively large amounts of energy which may be handled at ordinary operating voltages. With these valves in particular, and in some instances with valves of other types, it is highly desirable to maintain the grid of a valve negative with respect to its cathode whenever its anode potential is positive and it is desired to maintain the valve nonconductive. In the majority of the converting apparatus of the prior art, it is necessary to render the electric valves alternately conductive and nonconductive in a predetermined sequence. This has been accomplished usually by the use of negative bias batteries for maintaining the valves nonconductive and by impressing upon the grid of each of the several valves an alternating potential of the proper phase relation to periodically overcome the negative bias and render the valve conductive. Bias batteries are, however, unsatisfactory from an operating standpoint.

In a copending application of Alexanderson, Mittag and Phillipi, Serial No. 645,266, filed December 1, 1932, and assigned to the same assignee as the present application, there is disclosed an electric valve converting apparatus in which the use of negative bias batteries is eliminated. In accordance with the invention of that application, there is impressed upon the grid of each valve a potential derived from the anode-cathode voltage, but opposite in phase thereto, so that whenever the anode is positive and the valve would normally be in a condition to conduct current, the grid is simultaneously negative. In some instances, however, particularly when operating an electric valve converting apparatus at exceptionally high voltages, it is desirable to have a larger margin of safety than is provided by the apparatus disclosed in that application. For example, the margin of safety may be increased by forcing the grid of each valve negative well ahead of the moment when the anode becomes positive, to make certain that the valve will not become conductive in improper sequence at the beginning of the cycle. The margin of safety may be further increased by forcing the grids negative during the latter portion of each half cycle of positive anode potential and maintaining the grid negative for a short interval of time after the anode has become negative. This will ensure that the valve will not become conductive in improper sequence near the end of the half cycle of positive anode potential. Furthermore, if the grid is maintained negative during the latter portion of the intervals in which the valve is conductive and extending thereafter, it draws a positive ion current which, it has been found, tends to reduce electronic grid emission.

It is an object of my invention, therefore, to provide a new and improved grid excitation circuit for the electric valves of an electric valve converting apparatus which will overcome the above-mentioned disadvantages of the arrangements of the prior art and which will be simple and reliable in operation.

It is another object of my invention to provide a new and improved grid excitation circuit for an electric valve converting apparatus which will eliminate the necessity for the use of bias batteries or other independent sources of bias potential.

It is a further object of my invention to provide a new and improved excitation circuit for an electric valve converting apparatus which will ensure that the electric valves will not become conductive in an improper sequence.

In accordance with one embodiment of my invention, an electric valve converting apparatus connected to transmit energy from a source of current through a plurality of electric valves is provided with an excitation circuit for each of the valves including means for impressing upon the grid of each valve a potental dependent upon the instantaneous anode potential of the corresponding valve, but of opposite polarity, to maintain the valve normally nonconductive. Phase retarding means, such as a capacitor, is connected in circuit with the biasing means to delay the reversal of the grid potential from negative to positive until after the anode potential has reversed from positive to negative, while the grid transformer which supplies normal excitation for the electric valve is provided with a direct current exciting winding which provides a magnetic bias to advance the point in the cycle at which the grid potential reverses from positive to negative to ensure that this reversal takes place before the reversal of the anode potential from negative to positive. There is also provided means for periodically overcoming the above-described biasing grid potential to render the valves conductive in a predetermined sequence to transmit energy to the load circuit of the apparatus.

For a better understanding of my invention, together with other and further objects thereof, reference is had to the following description taken in connection with the accompanying drawing and its scope will be pointed out in the appended claims. Fig. 1 of the drawing illustrates an electric valve converting apparatus embodying my invention for transmitting energy from a single phase alternating current supply circuit to a quarter phase alternating current motor, while Fig. 2 shows a modified form of my improved grid excitation circuit.

Referring now more particularly to Fig. 1 of the drawing, there is illustrated an arrangement embodying my invention for operating at variable speed a quarter phase motor 10 from a single phase alternating current supply circuit 11. The motor 10 may be of any of the several types well known in the art, although I have illustrated by way of example a motor having the structural characteristics of a synchronous motor and comprising the phase windings 12 and 13 and a rotatable field winding 14. The field winding 14 may be connected in series with the armature windings as illustrated, in case it is desired to give the motor series characteristics, or in case shunt characteristics are desired the field winding may be separately excited in any well known manner. As illustrated, the field winding 14 is connected between the electrical neutrals of the phase windings 12 and 13, a circuit which carries unidirectional current, as will be explained more fully hereinafter. A variable resistor 15 may be connected across the field winding 14 to regulate the speed-torque characteristics of the motor, in which case it is preferable also to include a reactor 16 in series with the parallel connected winding 14 and resistor 15. The terminals of the armature phase winding 12 are connected to the terminals of the supply circuit 11 through two groups of similarly connected electric valves 17 and 18, and 19 and 20, respectively. Similarly, the terminals of the armature phase winding 13 are connected to the supply circuit 11 through two groups of electric valves 21 and 22, and 23 and 24, respectively, connected oppositely to the valves 17–20, inc. Each of the electric valves 17–24, inc., is provided with an anode, a cathode and a control grid, and may be of any of the several types well known in the art, although I prefer to use valves of the vapor electric discharge type.

In order to maintain the electric valves normally nonconductive, an excitation circuit A is provided for each of the several electric valves. This circuit comprises a grid transformer 25 provided with a primary winding 26 energized in accordance with the potential between the anode and cathode of the corresponding valve, as for example, by connecting it across a portion of a potentiometer 27, the terminals of which are connected to the anode and cathode of the electric valve. The grid transformer 25 is provided also with a secondary winding 28 connected between the grid and cathode of the valve through a current limiting resistor 29. A stabilizing resistor 30 is also preferably connected directly between the grid and cathode of the valve to stiffen the grid circuit. The polarity of the windings 26 and 28 is so chosen that the grid and anode potentials are of opposite polarity and the valve is maintained normally nonconductive.

In order to render the several electric valves 17–24, inc., conductive in a predetermined sequence, each grid transformer 25 is provided with an additional primary winding 31 and these windings 31 of the several grid transformers are energized from the alternating current circuit 11 through any suitable phase shifting arrangement such as an impedance phase shifting circuit 32, and a distributor 33 driven by the motor 10. The distributor 33 is provided with a brush for each phase terminal of the armature windings 12 and 13 and in corresponding mechanical phase relation (assuming a two-pole motor as illustrated). These brushes serve to energize the resistors 34, 35, 36 and 37, respectively, from the impedance phase shifting circuit 32. The primary windings 31 of the grid transformers associated with the pairs of valves 17 and 18, 19 and 20, etc., connected to a particular phase terminal of the armature windings 12 and 13, are energized with the potential across the resistor which is excited from the brush of the distributor 33 of the corresponding phase relationship. As is well understood by those skilled in the art, the impedance phase shifting circuit 32 may be adjusted to vary the phase relation between the potentials supplied to the grids of the several electric valves by the windings 31 and the correspondending anode potentials of the valves to vary the average voltage impressed upon the armature windings of the motor 10. In certain cases, it may be desirable also to include unilaterally conductive devices, such for example as contact rectifiers 38, in the circuits of the primary windings 31 of the several transformers 25 to prevent the occurrence of certain transients resulting from the interruption of current in the excitation circuits by the commutator 33, as explained in more detail hereinafter. Each of the several transformers 25 is also provided with a third primary winding, or exciting winding, 39, which windings are connected to be energized with unidirectional current from a direct current source 40 through an adjustable resistor 41 to produce a variable magnetic bias in the cores of the transformers 25. A capacitor 42 is connected across one of the windings of each of the transformers 25, as for example the winding 26, to retard the phase of the potential impressed upon the grid of the associated valve.

The general principles of operation of the above described apparatus for transmitting energy from the alternating current circuit 11 to the motor 10 will be well understood by those skilled in the art, or will be found explained in detail in my copending application Serial No. 598,380, filed March 12, 1932, and assigned to the same assignee as the present application. That application discloses and broadly claims the above described power circuit as well as the feature of selectively energizing the grids of the several electric valves from a source of alternating potential through a commutating device. In brief, the operation will be explained assuming that the motor field 14 and the distributor 33 are substantially in the position illustrated and that the impedance phase shifting circuit 32 is so adjusted that the potentials impressed upon the several resistors are substantially in phase with the alternating potential of the circuit 11. Under these conditions it will be seen that the windings 31 of the grid transformers associated with the groups of valves 17 and 18, and 21 and 22, are excited from their respective resistors 34 and 35. These two groups of valves 17 and 18, and 21 and 22, comprise a full wave rectifying circuit of which the load circuit is the lower half of the motor armature winding 12, the armature field winding 14, the reactor 16, and the left-hand portion of the motor armature winding 13. The resultant field created by current flowing in the armature windings 12 and 13 will be in such a direction as to cause a torque upon the motor field 14 and initiate rotation of the motor, which it will be assumed, is in a clockwise direction, as indicated by the arrow.

When the motor 10 has rotated through approximately 90 electrical degrees, resistor 35 will be deenergized and the resistor 37 will be energized by their respective brushes of the distributor 33. The result is that the group of valves 21 and 22 becomes nonconductive, and the group 23 and 24 becomes conductive to transfer current from the left-hand portion to the right-hand portion of the armature winding 13. The armature field of the motor 10 is thus advanced 90 electrical degrees and a torque is produced on the motor field to rotate it through an additional 90 degrees. In this manner current is successively commutated between the several terminals of the armature windings 12 and 13 to produce a rotating armature field and a rotation of the motor 10. The distributor 33 serves to excite only those valves connected to the terminals of the armature windings which are in torque producing position with respect to the motor field at the particular instant.

As is well understood by those skilled in the art, the average voltage impressed upon the armature windings 12 and 13 may be reduced for starting conditions by retarding the phase of the potentials applied to the grid transformer windings 31 by means of the impedance phase shifting circuit 32, an operation well known in the art. By gradually advancing the phase of the grid potentials by the impedance phase shifting circuit, the average voltage impressed on the motor 10 may be increased to increase the speed of the motor. Additional speed control may be obtained by adjusting the variable resistor 15 connected in parallel with the field winding 14. With the above described arrangement, the motor 10 will be given speed torque characteristics similar to those of a direct current series motor.

The improved excitation current described above is effective to ensure that each of the several electric valves is maintained nonconductive except during those intervals in which a positive potential impulse is supplied by its associated grid transformer winding 31. For example, considering the electric valve 17, if the anode potential is positive, a positive potential is impressed upon the primary winding 26 of the grid transformer 25 by means of the potentiometer 27. This potential is impressed upon the grid of the valve 17 with reverse polarity by means of the transformer winding 39. The resistor 30 connected directly between the grid and cathode is for the purpose of stabilizing or stiffening the grid circuit, that is, establishing a definite impedance in the grid circuit which might become indefinite during those intervals in which no current is flowing in the grid-cathode circuit of the valve. When the anode potential of the electric valve 17 is negative, a positive potential will be impressed upon its grid by the transformer 25 but this positive potential is ineffective to render the valve conductive because of its unilateral conductivity characteristics which prevent it from conducting current whenever its anode is negative.

With only the apparatus last described, however, the grid potential of the valve 17 would reverse polarity from negative to positive at the same instant that the anode potential would reverse polarity from positive to negative, under normal conditions. However, under certain abnormal operating conditions or under certain transient conditions, it might occur that the grid potential would have a certain phase shift, reversing polarity from negative to positive before the anode potential reversed from positive to negative, thus rendering the valve conductive near the end of the positive half cycles of anode potential when no impulse was supplied by the transformer primary winding 31, that is, in an improper sequence. This result is avoided by the capacitor 42 connected across the primary winding 26 of the transformer 25, or if preferred, across any other winding of this transformer. The effect of this capacitor is to retard the phase of the potental applied to the grid of the electric valve, thus ensuring that it does not reverse polarity from negative to positive for a sufficient interval of time after the anode potential has reversed polarity from positive to negative to provide an adequate margin of safety.

The capacitor 42 alone, however, would at the same time, tend to retard the reversal of polarity of the grid potential from positive to negative until after the anode potential reverses from negative to positive, thus rendering the valve conductive at the beginning of its positive half cycle of anode potential in an improper sequence. This result is avoided by means of the magnetic biasing winding 39 energized from the unidirectional current source 40. The effect of this magnetic bias upon the grid transformer 25 is to advance the point in the cycle at which the potential of the winding 28 reverses polarity from positive to negative a sufficient interval before the anode reverses polarity from negative to positive to ensure that the valve is not rendered conductive improperly at the beginning of its half cycles of positive anode potential. The unidirectional magnetic bias provided by winding 39, however, does not substantially affect the point in the cycle at which the grid potential reverses polarity in the opposite direction. In this manner an adequate margin of safety is provided at both the beginning and the end portions of the half cycles of positive anode potential and each of the several electric valves is continuously maintained non-conductive except during those intervals when its associated transformer winding 31 is excited to impress a positive potential on its grid.

The contact rectifier 38 included in series with the primary windings 31 of the grid transformers 25 are for the purpose of preventing a flow of exciting current in the windings 31 which tends to induce a negative potential upon the grids of the associated valves. If such a current is permitted to flow, it may be periodically broken by the distributor 33 and this sudden interruption of the exciting current of the transformer windings 31 produces positive transients in the secondary windings 28 which are impressed upon the grids of the associated valves to render them conductive in an improper sequence.

In Fig. 2 is shown a modified form of the grid excitation circuit of Fig. 1 in which the unidirectional magnetic bias for the transformers 25 is replaced by a biasing circuit included directly in the grid circuit of the electric valve. This biasing circuit comprises a biasing capacitor 44, charged by the rectified grid current of the electric valve, and an associated leak 45. If desired, a phase adjusting capacitor 46 may be connected in parallel to the stabilizing resistor 30. In this arrangement, also, the potentiometer 27 of the excitation circuit of Fig. 1 is replaced by a resistor 43 connected in series with the primary winding 26 of the grid transformer 25. The operation of the grid excitation circuit of Fig. 2 is in all respects similar to that described above in connection with Fig. 1.

While I have illustrated my invention as embodied in an arrangement for operating a dynamo-electric machine at variable speeds from an alternating current source of fixed frequency, it is to be understood that my improved grid excitation circuit is of general application to electric valve converting apparatus for transmitting energy between direct and alternating current circuits, direct current circuits of different voltages, or alternating current circuits of the same or different frequencies.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In an electric valve converting apparatus for transmitting energy from a source of current through a plurality of electric valves each provided with an anode, a cathode, and a control grid, a grid excitation circuit for each of certain of said valves comprising means for impressing upon the grid an alternating potential derived from the anode-cathode potential of the corresponding valve to maintain said valve normally nonconductive, means for retarding the phase of said grid potential with respect to said anode potential by more than 180 electrical degrees, and means for periodically overcoming said grid potential to render said valve conductive.

2. In an electric valve converting apparatus for transmitting energy from a source of current through a plurality of electric valves each provided with an anode, a cathode, and a control grid, a grid excitation circuit for each of certain of said valves comprising a potential divider connected between the anode and cathode of the corresponding valve, means for exciting said grid from said potential divider and for retarding the grid potential with respect to the anode potential by more than 180 electrical degrees to maintain said valve normally nonconductive, and means for periodically overcoming said grid potential to render said valve conductive.

3. In an electric valve converting apparatus for transmitting energy from a source of current through a plurality of electric valves each provided with an anode, a cathode, and a control grid, a grid excitation circuit for each of certain of said valves comprising means for deriving from the anode-cathode potential of the corresponding valve a potential substantially in phase opposition thereto, a capacitor connected in circuit with said means to retard the phase of said grid potential, whereby said value is normally maintained nonconductive and means for periodically overcoming said grid potential to render said valve conductive.

4. In an electric valve converting apparatus for transmitting energy from a source of current through a plurality of electric valves each provided with an anode, a cathode, and a control grid, a grid excitation circuit for each of certain of said valves comprising a potential divider connected between the anode and cathode of the valve, a grid transformer provided with a primary winding energized from said potential divider, the connections being such that the grid and anode potentials are of substantially opposite polarity to maintain said valve normally nonconductive, a capacitor connected across one of said transformer windings to retard the phase of the grid potential, and means for periodically overcoming said grid potential to render said valve conductive.

5. In an electric valve converting apparatus for transmitting energy from a source of current through a plurality of electric valves each provided with an anode, a cathode, and a control grid, a grid excitation circuit for each of certain of said valves comprising a grid transformer provided with a primary winding energized in accordance with the anode potential of the corresponding valve to maintain said valve normally nonconductive, an auxiliary winding for said transformer, and means for energizing said auxiliary winding with a direct current of such a polarity as to advance the point in the cycle at which said grid potential reverses from positive to negative to ensure that such reversal takes place before the reversal of the anode potential from negative to positive, and means for periodically overcoming said grid potential to render said valve conductive.

6. In an electric valve converting apparatus for transmitting energy from a source of current through a plurality of electric valves each provided with an anode, a cathode, and a control grid, a grid excitation circuit for each of certain of said valves comprising a grid transformer provided with a winding energized in accordance with the anode-cathode potential of said valve, the connections being such that the grid and anode potentials are of substantially opposite polarity to maintain said valve normally nonconductive, means for retarding the phase of the grid potential to ensure that it will not reverse from negative to positive until after the anode potential reverses from positive to negative, a second winding for said grid transformer energized with a direct current of such a polarity as to advance the point in the cycle at which said grid potential reverses from positive to negative to ensure that such reversal takes place before the reversal of the anode potential from negative to positive, and means for periodically overcoming said grid potential to render said valve conductive.

7. In an electric valve converting apparatus for transmitting energy from a source of current through a plurality of electric valves each provided with an anode, a cathode, and a control grid, a grid excitation circuit for each of certain of said valves comprising a grid transformer provided with a winding energized in accordance with the anode-cathode potential of said valve, the connections being such that the grid and anode potentials are of substantially opposite polarity to maintain said valve normally nonconductive, means for retarding the phase of the grid potential to ensure that it will not reverse from negative to positive until after the anode potential reverses from positive to negative, a second winding for said grid transformer energized with a direct current of such a polarity as to advance the point in the cycle at which said grid potential reverses from positive to negative to ensure that such reversal takes place before the reversal of the anode potential from negative to positive, a third winding for said grid transformer, and a source of grid potential for energizing said third winding to render said valve conductive, said source of grid potential being of a frequency equal to that at which it is desired to commutate the current between said valves.

8. In an electric valve converting apparatus for transmitting energy from a source of alternating current through a plurality of electric valves each provided with an anode, a cathode, and a control grid, a grid excitation circuit for each of certain of said valves comprising a grid transformer provided with a winding energized in accordance with the anode-cathode potential of said valve, the connections being such that the grid and anode potentials are of substantially opposite polarity to maintain said valve normally nonconductive means for retarding the phase of the grid potential to ensure that it will not reverse from negative to positive until after the anode potential reverses from positive to negative, a second winding for said grid transformer energized with a direct current of such a polarity as to advance the point in the cycle at which said potential reverses from positive to negative to ensure that such reversal takes place before the reversal of the anode potential from negative to positive, a third winding for said grid transformer, means for deriving from said alternating current source an alternating potential, commutator means for periodically impressing said alternating potential upon said third winding to render said valve conductive, and means for varying the phase of said alternating potential to control the energy transmitted by said apparatus.

9. In an electric valve converting apparatus for transmitting energy from a source of alternating current through a plurality of electric valves each provided with an anode, a cathode, and a control grid, a grid excitation circuit for each of certain of said valves comprising a grid transformer provided with a winding energized in accordance with the anode-cathode potential of said valve, the connections being such that the grid and anode potentials are of substantially opposite polarity to maintain said valve normally nonconductive, means for retarding the phase of the grid potential to ensure that it will not reverse from negative to positive until after the anode potential reverses from positive to negative, a second winding for said grid transformer energized with a direct current of such a polarity as to advance the point in the cycle at which said grid potential reverses from positive to negative to ensure that such reversal takes place before the reversal of the anode potential from negative to positive, a third winding for said grid transformer, means for deriving from said alternating current source an alternating potential, commutator means for periodically impressing said alternating potential upon said third winding to render said valve conductive, and rectifying means interposed between said commutator and said third winding to suppress the negative half cycles of said alternating potential.

10. In combination, a source of current, a load circuit, means for transmitting energy from said source to said load circuit including a plurality of electric valves each provided with an anode, a cathode, and a control grid, a grid excitation circuit for each of said valves comprising a grid transformer provided with a winding energized in accordance with the anode-cathode potential of said valve, the connections being such that the grid and anode potentials are of substantially opposite polarity to maintain said valve normally nonconductive, means for retarding the phase of the grid potential to ensure that it will not reverse from negative to positive before the anode potential reverses from positive to negative, a second winding for said grid transformer energized with a direct current of such a polarity as to advance the point in the cycle at which said grid potential reverses from positive to negative to ensure that such reversal takes place before the reversal of the anode potential from negative to positive, and means for periodically overcoming said grid potential to render said valve conductive.

11. In combination, a source of alternating current, a load circuit, means for transmitting energy from said source to said load circuit including a plurality of electric valves each provided with an anode, a cathode, and a control grid, a grid excitation circuit for each of said valves comprising a grid transformer provided with a winding energized in accordance with the anode-cathode potential of said valve, the connections being such that the grid and anode potentials are of substantially opposite polarity to maintain said valve normally nonconductive, means for retarding the phase of the grid potential to ensure that it will not reverse from negative to positive before the anode potential reverses from positive to negative, a second winding for said grid transformer energized with a direct current of such a polarity as to advance the point in the cycle at which said grid potential reverses from positive to negative to ensure that such reversal takes place before the reversal of the anode potential from negative to positive, a third winding for said transformer, means for deriving from said alternating current source an alternating potential, and means controlled by said load circuit for periodically impressing said alternating potential upon said third winding to render said valve conductive.

ERNST F. W. ALEXANDERSON.